US005404787A

United States Patent [19]

Kubach

[11] Patent Number: 5,404,787

[45] Date of Patent: Apr. 11, 1995

[54] FINGERS DRUM BRUSH

[76] Inventor: John S. Kubach, 1406 Milan Rd., Sandusky, Ohio 44870

[21] Appl. No.: 110,569

[22] Filed: Aug. 23, 1993

[51] Int. Cl.[6] .................... G03B 7/00

[52] U.S. Cl. .................... 84/422.1

[58] Field of Search .................... 84/422.1, 422.2, 422.4

[56] References Cited

U.S. PATENT DOCUMENTS

| | | | |
|---|---|---|---|
| 2,513,930 | 7/1950 | Goldrich | 84/422.1 |
| 4,028,983 | 6/1977 | Calato | 84/422 S |
| 4,200,026 | 4/1980 | Phreaner | 84/422 S |
| 4,559,860 | 12/1985 | Cordes | 84/422 S |
| 4,590,839 | 5/1986 | Liedtke et al. | 84/422 S |

*Primary Examiner*—Michael L. Gellner
*Assistant Examiner*—Patrick J. Stanzione
*Attorney, Agent, or Firm*—Jerry Semer

[57] ABSTRACT

This invention is a new percussion instrument that is used for striking other percussion instruments. It consists of a handle and a fan like set of fingers attached to one end of a traverse control rod. In the preferred embodiment of the invention, the fan like set of fingers are made of metal and have protrusions on them and can have tips to make a more brilliant sound. The fan like set of fingers can be varied from a single finger to a planar or fan like spread. By varying the fan like spread of the fingers, one changes the sound of the brushes striking the percussion instrument. The fan like spread is locked into place so that the spread does not change while the individual is playing the drums. This single percussion instrument produces increases in both the swish sound and the striking sound. Balanced, it plays like a drumstick opening a totally new and broad range of percussive colors, textures and tonalities.

17 Claims, 7 Drawing Sheets

FINGERS DRUM BRUSH

FIELD OF INVENTION

This invention relates to a percussion instrument utilized in the generation of rhythmic percussion sounds and effects and more particularly to a unique drum brush type percussion instrument that achieves a wider and deeper range of percussion sounds then here before possible.

BACKGROUND OF THE INVENTION

The traditional and most popular percussion instruments are the drumstick and drum brush. Typically, the drumstick is an elongated segment of wood cylindrically shaped and tapered at one end featuring a ball-type tip. By striking the ball-type tip on drumheads, cymbals or other percussion instruments, relatively sharp and crisp percussion sounds and effects are achieved. The typical drum brush is composed of an elongated tube encasing a multiplicity of pliable narrow gauge metal or plastic wires attached to a traverse control rod that telescopically extends and retracts controlling the degree of wire spread. The primary purpose of the drum brush is to produce a rhythmic percussion swishing sound. The swishing sound is the result of frictional resistance produced by simultaneously compressing and sweeping the drum brush wires down upon the drumhead surface. To enhance the swishing sound, some drummers lightly sand their drumheads to increase frictional resistance. However, even the most aggressive drummer is capable of achieving only a modest volumetric level of the swishing sound. The metal or plastic drum brush wires are too pliable and diminutive to allow a strong, forceful and full swishing sound. The advent of the plastic drumhead replacing the customary natural cowhide drumhead has served to exacerbate the phenomenon. The smooth surface of the plastic drumhead substantially reduces frictional resistance virtually eliminating the drummer's ability to generate a functional swishing sound. In addition, the typical drum brush is inadequate as an effective percussive instrument. The striking of a drum, cymbal or other percussion instrument with a traditional drum brush produces a blunt, dull and muted response. Even with intense physical effort a drummer cannot achieve a sharp and crisp sound utilizing drum brushes. The traditional drum brush was designed and constructed to produce a swishing rather than a sharp percussive sound. Subsequently modern drummers rarely perform with drum brushes.

The narrow gauge metal or plastic wires of the typical drum brush are susceptible to bending, kinking and breaking requiring careful handling in playing and storage. In playing the wires can become entangled between the drumhead and rim causing the wires to bend or break. Once the drum wires become so damaged it is impossible to restore them to their original condition. In addition the traditional drum brush is ill-suited for the playing of complex percussion patterns and fast tempos. The inherent sluggish response and the dull and muted striking tones of the pliable drum brush wires prevent clear concise percussive sounds.

Objects of the present invention are to provide a drum brush type percussion instrument capable of producing a higher volume swishing sound and, utilizing the identical balanced percussive instrument, produce bright, crisp striking sounds on drums, cymbals and other percussion implements with performance control similar to that of a drumstick opening a totally new and broad range of percussive colors and tonalities.

BRIEF DESCRIPTION OF THE PRIOR ART

There have been attempts to design a metal or plastic wire drum brush to increase the volume of the swishing sound as in the Phreaner Patent (U.S. Pat. No. 4,200,026) entitled "Brush Type Drumstick." The patent allegedly teaches a drum brush comprising 27 to 32 stiff polypropylene fibers with a major diameter of about 0.0055" to 0.060" having a generally D-shaped transverse cross-section providing a greater area of potential contact between the plastic filament and the drum surface producing a stronger sound. While the Phreaner drum brush is apparently capable of generating the swishing and percussive sounds similar to the traditional drum brush, it is unable to produce the volume of the swishing sound nor the crisp, sharp and loud percussive striking sounds nor the wide range of new percussive sounds achievable in the present invention.

Another patent to Cordes (U.S. Pat. No. 4,559,860) entitled "Drum Brush" allegedly teaches a drum brush composed of a plurality of stiff coiled wire filaments with a closed end loop produces a sharper sound on the drum and a more brilliant sound on the cymbal than the traditional drum brush. The Cordes Patent further purports that the closed end loop prevents the snagging of the drum brush wires between the drumhead and rim and damage to the drumhead. The Patent also relates to the frictional drag of a plastic sleeve within the handle provides a type of clamping device to secure the wire filaments at any desired position. Apparently the closed end loop of the wire filaments prevents impairment of the wire filaments and drumhead surface and the frictional action of the plastic sleeve produces a type of clamping function. While the Cordes drum brush may be able to simulate the swishing and percussive striking sounds of the traditional drum brush it is incapable of producing the volume of the swishing sound nor the rich and loud percussive striking sounds nor the wide range of new percussive sounds achievable by the present invention. Wire filament percussion instruments inherently possess low volume swishing and percussive striking potential. Moreover, performance safety and the clamping function are an integral component of the present invention.

Another Patent to R. W. and G. R. Liedtke (U.S. Pat. No. 4,590,839) entitled "Pellet Drum Stick Brush" allegedly teaches a drum brush composed of a plurality of flexible wire bristles affixed to some of which are tempered pellets at calibrated positions enhances the percussive striking sound while preserving the swishing sound of the traditional drum brush. Although the affixed pellets may generate a strong and forceful percussive striking sound, it is unable to produce the volume of the swishing sound nor the wide range of new percussive sounds achievable by the present invention. Moreover the pellet protuberance prevents the wire bristles attached thereto from fully contacting the drumhead surface reducing frictional resistance and thereby the volume of the swishing sound.

Another Patent to Calato (U.S. Pat. No. 4,028,983) entitled "Adjustable Drum Brush" teaches a drum brush comprising a plurality of wires affixed to a traverse control rod with the control rod crimped at predetermined locations engages the wall of a hole in the end cap providing a frictional clamping function holding the traverse control rod at desired positions enhancing utility. Although the frictional clamping system of the Calato Patent may be an improvement compared with the traditional drum brush, it is not as secure a clamping system as the positive engagement serration clamping system integrated into the present invention.

The teachings in the field, therefore, are limited and fail to teach a drum brush that is capable of producing a strong, viable swishing sound and a bright, crisp and loud percussive striking sound, or a combination thereof, with the identical drum brush.

SUMMARY OF THE INVENTION

This invention is a new percussion instrument that is used for striking other percussion instruments. It consists of a handle and a fan like set of fingers attached to one end of the handle. In the preferred embodiment of the invention the fan like set of fingers are made of metal and have protrusions on them and can have tips to make a more brilliant sound. The fan like set of fingers can be varied from a single finger to a planar or fan like spread. By varying the fan like spread of the fingers one changes the sound of the brushes striking the percussion instrument. The fan like spread is locked into place so that the spread does not change while the individual is playing the drums.

One general object of the invention is to provide a single drum brush type percussion instrument capable of generating both a high volume swish sound and sharp, crisp and loud percussive striking sounds. More specifically, it is an object of the invention to provide a drum brush type percussion instrument capable of producing a wide range of the swishing sound, from soft low volume to brash high volume on natural and synthetic drumhead surfaces.

Another object of the invention is to provide a drum brush type percussion instrument capable of producing sharp, crisp and loud percussive sounds in the striking of drums, cymbals and other percussion implements. Another object of the invention is to provide a drum brush type percussion instrument that handles and responds similarly to the traditional drumstick permitting the drummer to produce more sensitive, precise percussive tones and perform more intricate percussive patterns at slow and fast tempos. Another object of the invention is to provide a drum brush type percussion instrument balanced along its full length that facilitates utilization and affords positive performance control. Another object of the invention is to provide a drum brush type percussion instrument that is capable of achieving a totally new and broad range of percussion colors and tonalities. Another object of the invention is to provide a drum brush type percussion instrument that incorporates positive clamping devices that positively engage and secure the traverse control rod at desired locations. Another object of the invention is to provide a drum brush type percussion instrument that incorporates a functional and practical gripping device with which to move the traverse control rod to desired positions. Another object of the invention is to provide a drum brush type percussion instrument of high quality, durability and economical to manufacture in the United States. Other objects, features and advantages of the invention will be more readily understood from the following description of the preferred embodiments and accompanying drawings.

BRIEF DESCRIPTIONS OF THE DRAWINGS

FIG. 1 is a top view of the invention.

FIG. *2a* is a top view of one of the fingers.

FIG. *2b* is a side view of one of the fingers of FIG. *2a.*

FIG. *3a* is a top view of the invention with the inner workingsof the handle shown in phantom.

FIG. *3b* is a side view of the invention and shows the tension springs.

FIG. *6a* shows a transverse cross-sectional view of the handle of the invention.

FIG. *6b* shows the serrations on the traverse control rod.

FIG. *6c* shows a transverse cross-section of the handle for another embodiment of a different shaped flange.

FIG. *7a* is an end view of the handle utilizing an end cap clamping system.

FIG. *7b* is a side view of the clamping system shown in FIG. *7a.*

FIG. *7c* is an end view of another embodiment utilizing an end cap clamping system.

FIG. *7d* is a top view of an embodiment of the locking device shown in FIG. *7c.*

FIG. *8a* is a transverse cross-sectional view of another embodiment of the locking device of the invention.

FIG. *8b* is a side view of the locking device shown in FIG. *8a.*

FIG. *8c* is a side view of another embodiment of the locking device of the invention.

FIG. *8d* is a top view of the slot and notches in the traverse control rod for use with the locking device for the embodiment shown in FIGS. *8a, 8b* and *8c.*

FIG. *9a* is a transverse cross-sectional view of another embodiment of the clamping system of the invention.

FIG. *9b, c* and *d* are side views of the locking device of the embodiment of the invention shown in FIG. *9a* with three different spring configurations.

FIG. *9e* is a top view of the serrations in the traverse control rod used for the locking device shown in FIG. *9a, b, c* and *d.*

DETAILED DESCRIPTION OF THE PREFERRED EMBODIMENT

Figure 1:
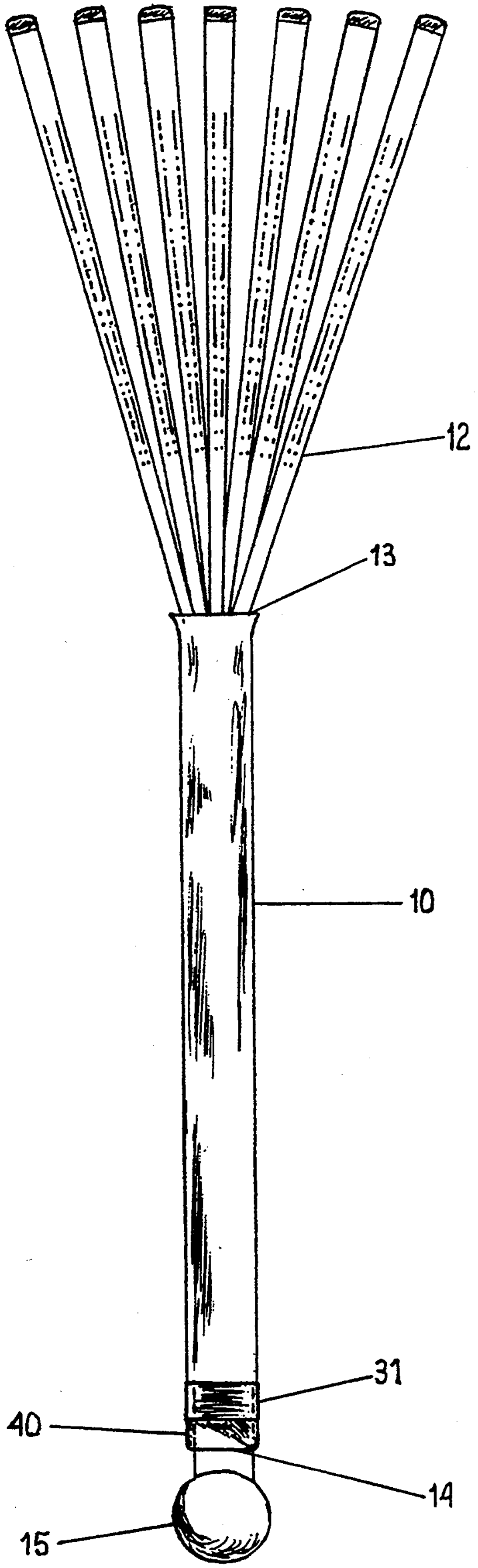

FIG. 1 shows an embodiment of the drum brush type percussion instrument in accordance with the present invention. FIG. 1 shows a tubular handle 10. Projecting from the tapered oval shaped opening 13 at one end of the tubular handle 10 are fingers 12. Projecting from the other end 14 of the tubular handle 10 is a gripping device 15. In FIG. 1, this gripping device is a round ball-like shape and is attached to a traverse control rod 11 shown in FIG. *3a* protruding through an end cap 40. This gripping device 15 could also have a hook-like shape or any other type of shape that is designed for easy grasping, pulling and pushing to extend the traverse control rod 11 through the handle 10. FIG. 1 also shows the rigid cylinder 31 which rotates around the handle 10 which serves as a locking device.

Figure 2A:
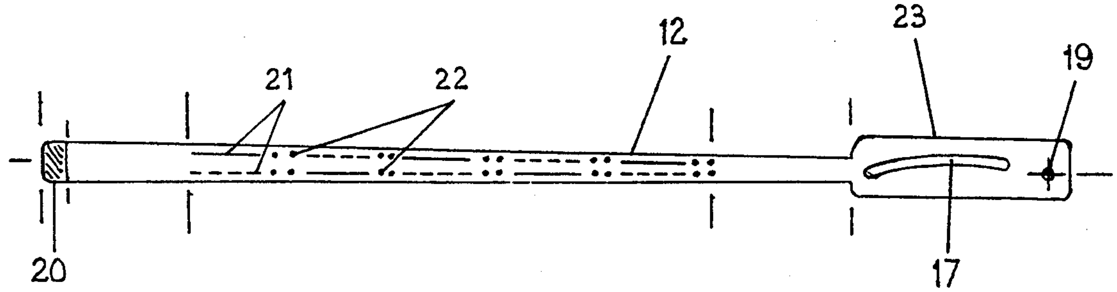
Figure 2B:
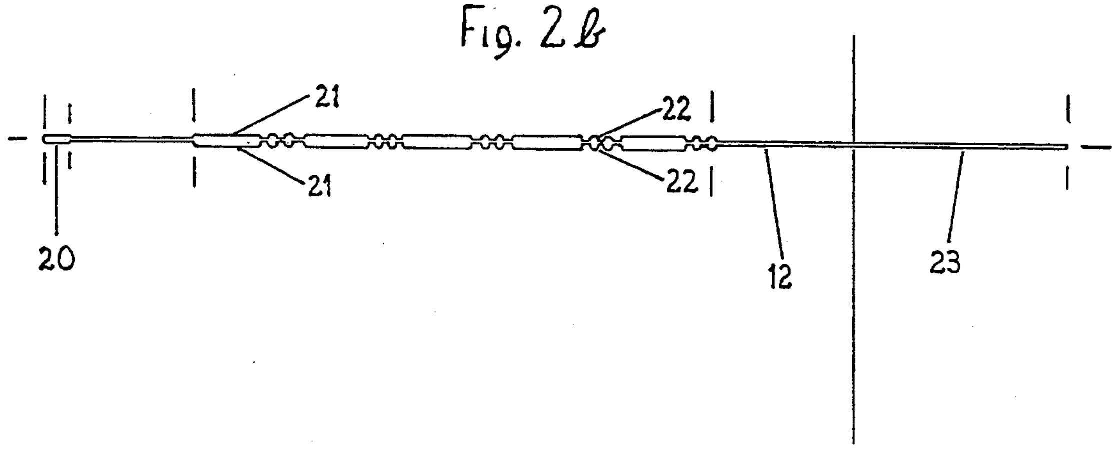

FIG. *2a* and *b* illustrate the fingers 12. These fingers 12 are thin, narrow, flexible pieces of material and in the preferred embodiment they are made from metal. There are seven fingers in the preferred embodiment, however these fingers can be of any number and configuration. The metal gives them a spring action and creates better and more varied subtle percussion sounds when used with a drum or other percussion instruments. FIG. 2*a* shows the top view of finger 12 as just flat narrow pieces of material. FIG. 2*b* shows the side view along the finger's 12 convexoconcave protuberances that are linear 21 and circular 22 shaped in design. As shown in FIG. 2*a*, these linear 21 and circular 22 shaped convexoconcave protuberances are smooth so as not to damage drumheads, cymbals or other percussion instruments. These protuberances can be of many other shapes; however, they are smooth so that they will not damage other percussion instruments.

Also, FIG. 2*a* and *b* show at one end of the finger 12 an enlarged tip end 20. This enlarged tip end 20 is fashioned similarly in an unobstructive manner. The enlarged tip end may be added to enhance the striking performance of the instruments. The enlarged tip end and the convexoconcave protuberances improve the sound of this percussion device. The enlarged tip is formed in the preferred embodiment by bending a piece of metal over the end and affixing the piece to the finger 12. The tip could also be formed by just bending over the end of the fingers. However, this enlarged tip could be formed by several methods known in the art.

FIG. 2*a* and *b* also show that at the end opposite of the enlarged tip 20 is an expanded end 23. The expanded end 23 is as thin and flat as the rest of the finger 12 as shown in FIG. 2*b*. However, the expanded end 23 is not as narrow as the rest of finger 12. Within the expanded end 23 is a slot 17 and an opening 19.

Figure 3A:
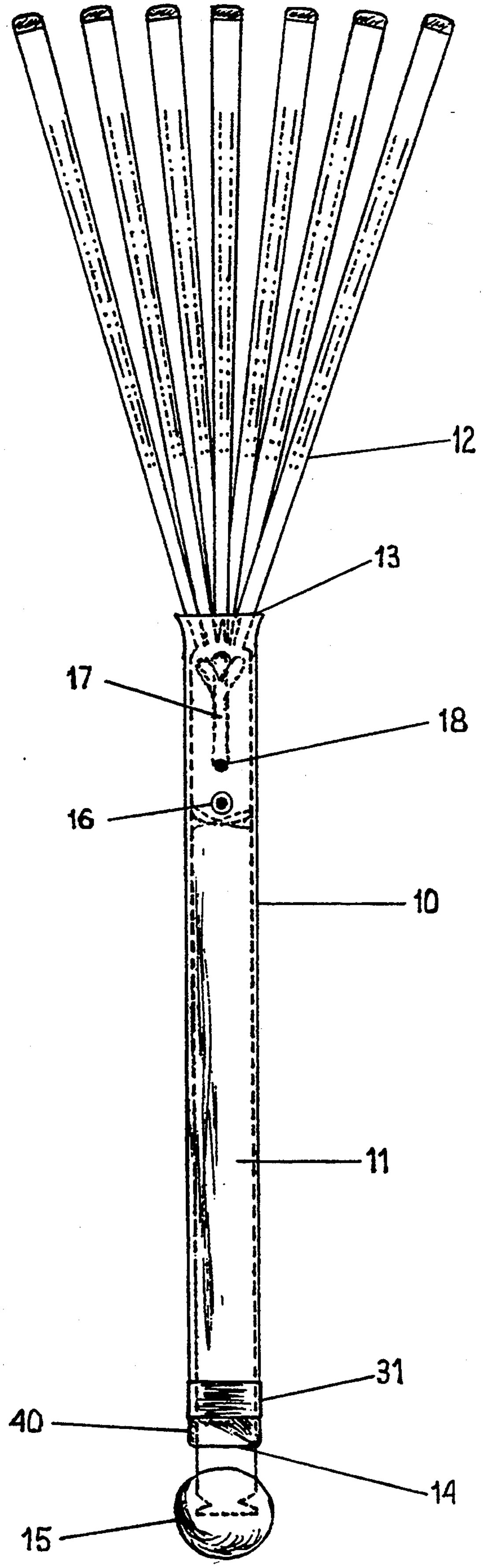
Figure 3B:
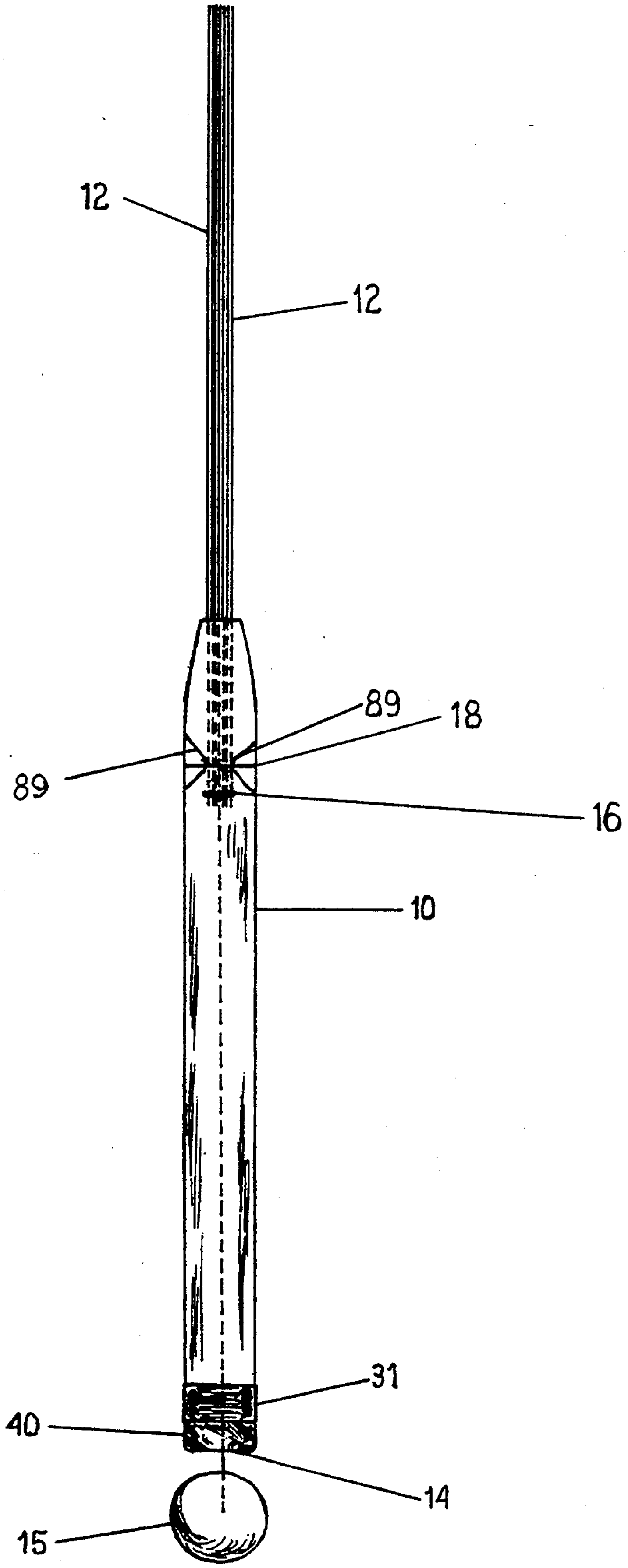

FIG. 3*a* shows the fingers 12 as they are placed in the handle 10. FIG. 3*a* shows the inner workings of the handle 10 in phantom. FIG. 3*a* shows that within the opening 13 is a rivet 16. Rivet 16 attaches the traverse control rod 11 to the multitude of fingers 12. The traverse control rod 11 can also be attached by several other methods known in the art. FIG. 3*a* also shows a pin 18 that is attached to the inner circumference of the handle 10 and fits through slot 17 in the fingers 12. FIG. 3*b* shows a spring 89 that places tension on the fingers 12 and holds them in position. Spring 89 in the preferred embodiment is a crimped piece of metal with a slot in it. The metal sets against the bottom and top of the handle and the V-shaped crimp places tension on the fingers 12 to hold them in place. The spring 89 has a slot in it open to pin 18.

Figure 4:
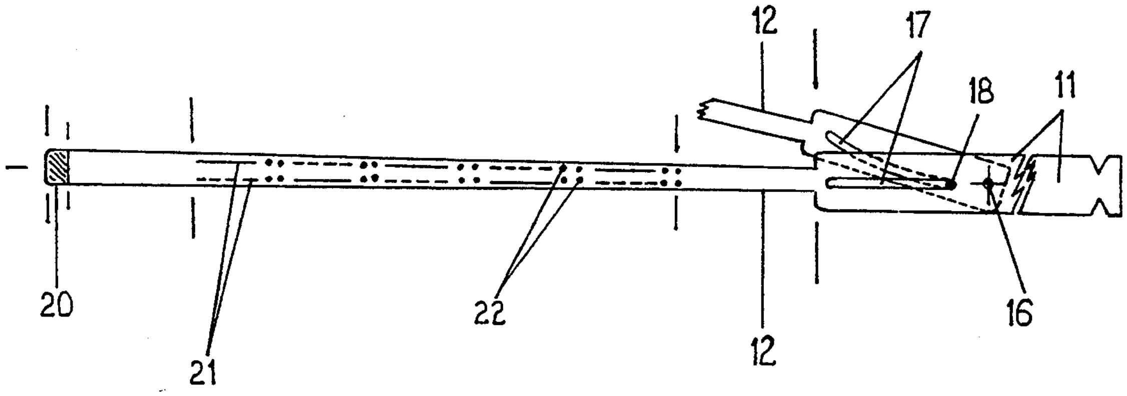
FIG. 4 is a top view of one of the fingers with another finger in position over it.
Figure 5:
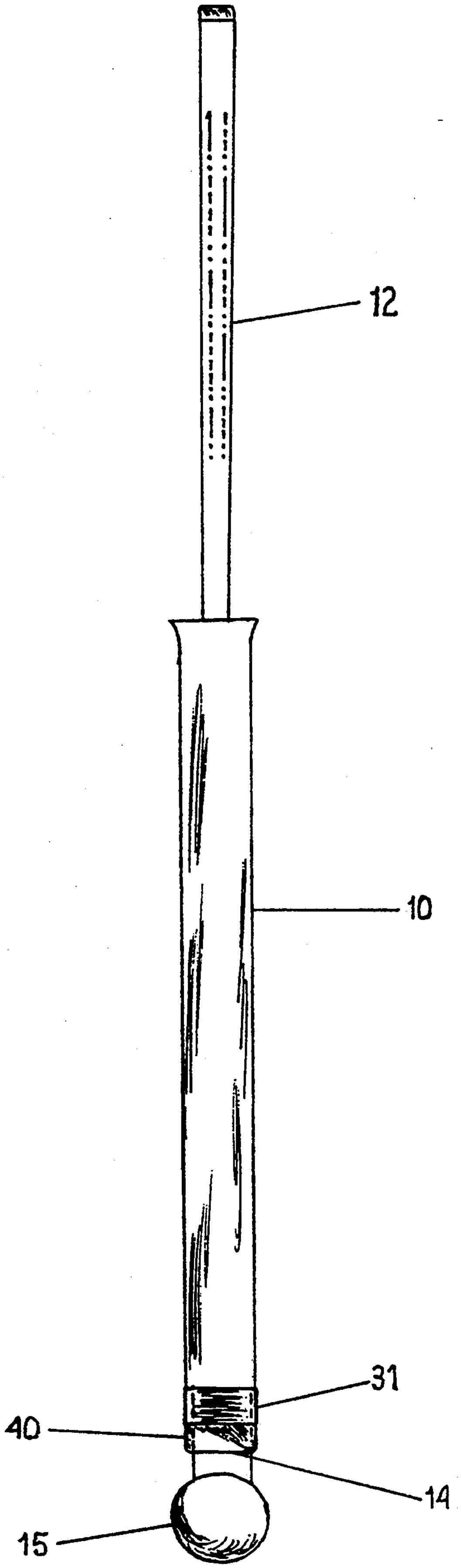
FIG. 5 is a top view of the invention with the fingers in a closed position.

FIG. 4 shows how the fingers 12 can be adjusted in a fan like planar spread. FIG. 3*a* shows that each finger has a slot 17. This slot can be either straight as shown in FIG. 3*a* or curved as shown in FIG. 3*a* and FIG. 2*a*. In the preferred embodiment one of the fingers has a straight slot 17 but the rest of the fingers 12 have differing curved slots 17. All of the slots in the fingers 12 differ which thus enables the fingers to be adjusted in a fan like planar spread. This is accomplished by attaching fingers 12 to the traverse control rod 11 by means of a rivet 16. The rivet allows the fingers to be firmly attached to the traverse control rod 11 while rotating slightly around the axis of the rivet 16. Within slot 17 is a pin 18 that is attached to the handle 10. When the traverse control rod 11 is pulled outward away from the handle or is pushed inward along the handle, this in turn pulls or pushes the fingers 12. The fingers 12 move inward and outward and this causes the pin 18 to be in different positions along the slot 17. If the slot 17 is straight, then the finger will just move inward and outward when pushed back and forth by the traverse control rod 11. However, if the slot 17 is curved, when the traverse control rod 11 is pulled or pushed, the stationary pin 18 moves relative to the slot 17 causing the fingers 12 to rotate on rivet 16 and thus causes the finger not only to move into and out of the handle, but also to move in a horizontal plane. If all of the fingers 12 have a different slot arrangement, then as the traverse control rod 11 is pulled inward and outward, these fingers would spread to produce a fan like configuration. In the preferred embodiment, the fingers 12 are stacked upon one another resulting in a planar spread of a single flat fan like projection. In this embodiment, when the traverse control rod 11 is pulled out of handle 10, the fingers 12 will stack upon one another and form just a single finger like protrusion as shown in FIG. 5. When the traverse control rod is pushed into the handle, then the planar spread of the fingers 12 is at maximum as in FIG. 1. The planar spread of course can be varied between these maximum and minimum positions by just pushing or pulling on the traverse control rod 11. By changing the spread of the fingers 12 the drummer can create a virtually infinite range of percussive sounds, tonalities and textures.

Figure 6A:
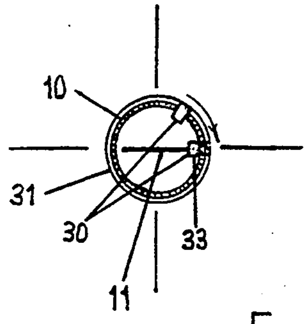
Figure 6B:
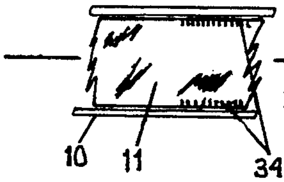
Figure 6C:
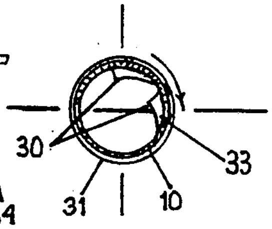

FIGS. 6*a* through 9*e* show several locking systems for the traverse control rod 11. These locking systems allow the traverse control rod 11 to be locked into position so that the spread of the fingers 12 does not change during the use of this device. FIG. 6*a* shows a transverse cross-sectional view of the end of handle 10. Flange 30 rotates perpendicular to the traverse control rod 11 and is attached to rigid cylinder 31 that fits over the tubular structure casing of handle 10. Cylinder 31 can be rotated around handle 10. This enables flange 30 to be rotated to locking position 33. FIG. 6*b* shows the traverse control rod 11 has several serrations 34 that are adapted to be engaged by flange 30. FIG. 6*a* shows flange 30 rotated into position 33 that positively engages one of the serrations 34 in the traverse control rod 11 locking said traverse control rod into position. FIG. 6*c* shows another shape for flange 30. In this embodiment the flange 30 is again rotated into a position that forms a positive engagement with the serrations 34 in the traverse control rod 11 locking the traverse control rod 11 into position.

Figure 7A:
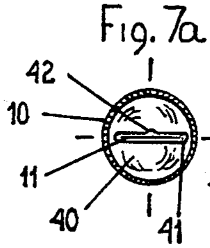
Figure 7B:
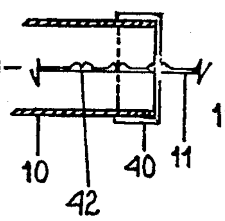

FIG. 7*a* shows another locking device for the traverse control rod 11. This locking system utilizing an end cap 40 affixed to the handle 10 allowing the traverse control rod 11 to pass through slot 41. On the surface of traverse control rod 11 are several V-shaped protuberances 42 as shown in FIG. 7*b* side view. These V-shaped protuberances 42 are adapted such that the lip on the top of slot 41 will fit within the V-shaped protuberances 42 thereby locking the traverse control rod 11 into a desired position.

Figure 7C:
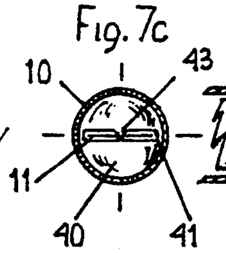
Figure 7D:
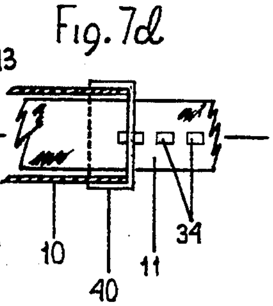

FIG. 7*c* shows another locking system using a V-shaped lip 43 formed into the end cap 40. The V-shaped lip 43 engages one of the openings 34 placed in the traverse control rod 11 locking the traverse control rod into place. FIG. 7*d* top view shows the openings 34 in the traverse control rod 11. An individual can move the traverse control rod 11 into any one of these openings and lock it into position.

Figure 8A:
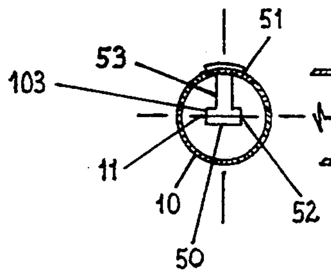
Figure 8B:
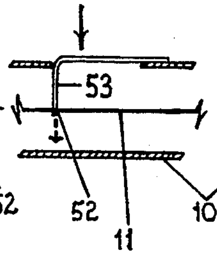

FIGS. 8*a* through 9*e* illustrate spring activated locking systems. FIG. 8*a* is a transverse cross-sectional view of the T-shaped spring 50 fitted within the handle 10. A slot 51 is placed into the handle 10 on the end of said handle opposite from where the fingers 12 protrude from the handle 10. A T-shaped spring 50 is attached to the outer surface of the handle 10 near the opening 51. The T-shaped spring 50 protrudes through the opening 51 and engages opening 52 in the traverse control rod 11 as shown in FIGS. 8*a*, *b* and *c*. Opening 52 is an elongated slot wherein the width is slightly larger then the neck portion 53 of the T-shaped spring 50. As shown in FIG. 8*d*, along each side of opening 52 are several pairs of notches 102. These pairs of notches 102 are slightly larger then the width of the neck portion 53 of the T-shaped spring 50. When the T-shaped spring 50 engages in a locked position, the T-shaped bar portion 103 of spring 50 fits within a set of notches 102 in the traverse control rod 11. To unlock the traverse control rod 11, one just puts pressure on the T-shaped spring 50 at opening 51 which pushes the bar portion 103 of the T-shaped spring 50 below the traverse control rod 11. Since the slot 52 in the traverse control rod 11 is larger then the neck portion 53 of the T-shaped spring 50, the traverse control rod 11 can be moved to another position or set of notches 102.

Figure 8C:
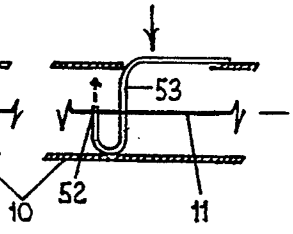
Figure 8D:
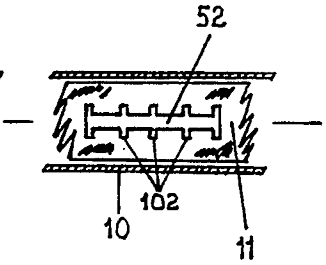

FIG. 8*c* shows another similar locking type arrangement. In this arrangement, the T-shaped spring 50 is activated from underneath the traverse control rod 11. The T-shaped spring 50 is attached to the outer surface of the handle near opening 51. It is run through opening 51 and through the slot 52 in the traverse control rod 11 and then back to the traverse control rod 11 in a U-shape. At the point where the T-shape spring 50 passes through the traverse control rod for the first time is a set of notches 102. The bar portion 103 of the T-shape spring 50 engages the notches 102 in the traverse control rod 11 and locks the traverse control rod 11 in place. When an individual wishes to move the traverse control rod 11, he just puts pressure on the spring 50 at the point where it runs through opening 51 forcing the bar portion 103 of the T-shaped spring 50 to move above the traverse control rod 11 and because the neck 53 of the spring 50 is smaller then the slot 52 in the traverse control rod 11, said traverse control rod can be moved to another point where the T-shaped spring 50 can engage the notches 102 of the slot 52. This locks the traverse control rod in a new position. FIG. 8*d* shows a top view of the slot 52 and notches 102 in the traverse control rod 11.

Figure 9A:
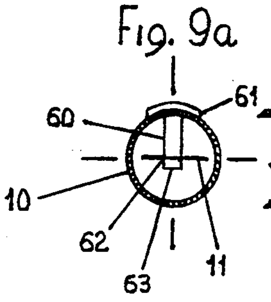
Figure 9B:
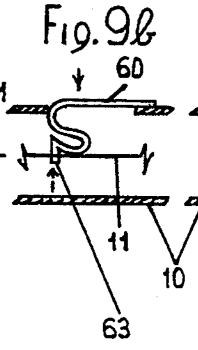
Figure 9C:
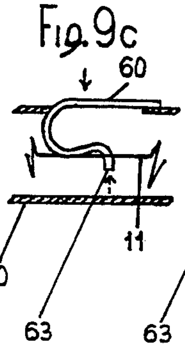
Figure 9D:
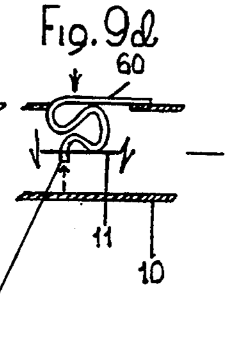
Figure 9E:
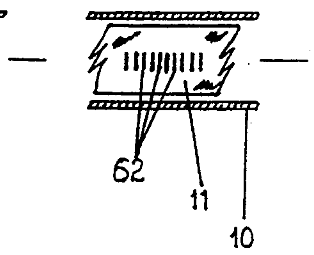

FIG. 9*a* is a transverse cross-sectional view of another embodiment of a spring activated clamping system utilizing a flat narrow spring 60. As in the previous embodiment, spring 60 is attached to the outer surface of the handle 10 and runs through an opening 61 in the handle 10. When the traverse control rod 11 is in a locked position in this embodiment, the narrow spring 60 engages the traverse control rod 11 at one of the openings 62. These openings 62 are shown in FIG. 9*e*. To place suitable tension upon the spring 60 to keep it in a locked position, spring 60 must pass through opening 61 and form an S-curve as shown in FIGS. 9*b*, 9*c* and 9*d*. These figures show three shapes in which the spring 60 can take as to forming this S-curve and creating sufficient tension so that the traverse control rod 11 can be locked into position. In order to unlock the traverse control rod, the S-shape allows that when pressure is placed on the opening 61 of the spring 60, that pressure lifts the engaging end 63 of spring 60 and causes the engaging end 63 to disengage from the openings 62 in the traverse control rod 11 and allows the traverse control rod 11 to be moved to another position in which this spring 60 reengages an opening 62 in the traverse control rod 11.

Changes in modification in the specifically described embodiments can be carried out without departing from the scope of the invention. The terms and expressions employed herein are terms of description and not limitation, and there is no intention in the use of such terms and expressions of excluding equivalents of the features shown and described or portions thereof, but it is recognized that various and varied modifications are possible within the scope of the invention claimed.

What is claimed:

1. A drum brush type percussion instrument comprising:
- a. a handle with two ends; and,
- b. two sided flat fingers that are more then twice as wide as they are thick and said fingers have two ends and said fingers are attached to the handle at one end and protrudes outward from the handle in a fan like shape.

2. A drum brush type percussion instrument as in claim 1 wherein:
- a. the handle is tubular in shape.

3. A drum brush type of percussion instrument as in claim 1 wherein:
- a. the two-sided flat fingers are of thin, narrow, flexible material.

4. A drum brush type percussion instrument as in claim 3 wherein:
- a. the flat fingers are made of metal; and,
- b. tips affix to the distal end of said flat fingers.

5. A drum brush type percussion instrument as in claim 1 further comprising:
- a. tips attach to the distal end of the fingers.

6. A drum brush type percussion instrument as in claim 1 further comprising:
- a. a means for narrowing and spreading the fingers in a fan like arrangement.

7. A drum brush percussion instrument as in claim 6 further comprising:
- a. the means for spreading and narrowing comprises:
  1. an elongated slot placed in the end of the fingers in which at least one of said slots is curved; and,
  2. a traverse control rod adapted to slidably fit in the handle to which the fingers are attached rotatably at the end which contains the slot; and,
  3. a pin attached to the handle and fits through the slot in each finger; and,
  4. whereby, when the traverse control rod is moved in and out of the handle the fingers attached to the traverse control rod also move in and out of the handle and thus the pin also moves to different positions along the slot and on the fingers whose slot is curved which causes the fingers to rotate through a cam like function.

8. A drum brush type percussion instrument as in claim 6 wherein:
- a. the means for spreading and narrowing comprises:
  1. an elongated slot placed in the end of the fingers in which at least one of said slots is curved; and,
  2. a traverse control rod adapted to slidably fit in the handle to which fingers are attached rotatably at the end which contains the slot; and,
  3. a pin attached to the handle and fits through the slot in each finger; and,
  4. whereby, when the traverse control rod is moved in and out of the handle the fingers attached to the traverse rod also move in and out of the handle and thus the pin also moves to different positions along the slot and on the fingers whose slot is curved causes the fingers whose slot is curved to rotate through a cam like function.

9. A drum brush type percussion instrument as in claim 8 further comprising:

a. a means for locking that locks the means for narrowing and spreading the fingers in a certain set position of the fan like spread.

10. A drum brush type percussion instrument as in claim 9 wherein:

a. the means for locking comprises:

1. a cylinder that is adapted to fit on the end of the handle opposite the fingers; and,
2. a flange attached to the cylinder; and,
3. serrations in the traverse control rod that are adapted to be engaged by the flange; and,
4. whereby the cylinder can be rotated around the handle moving the flange to a position that engages a serration in the traverse control rod thereby locking the traverse control rod in the desired position.

11. A drum brush type percussion instrument as in claim 10 wherein:

a. the flange is triangular shaped.

12. A drum brush type percussion instrument as in claim 9 wherein:

a. the means for locking:

1. an end cap affixed to the end of the handle opposite where the fingers protrude; and,
2. a slot with a lip in said end cap adapted such that the transverse control rod will slidably fit through the slot; and,
3. several V-shaped protuberances on the surface of the traverse control rod near the end of the traverse control rod that exit the handle through the slot; and,
4. whereby the V-shaped protuberances are adapted such that the lip on the top of the slot will fit within the V-shaped protuberance thereby locking the traverse control rod into a desired position.

13. A drum brush type percussion instrument as in claim 9 wherein:

a. then means for locking comprises:

1. an end cap over the end of the handle opposite the end from which the fingers protrude; and,
2. a slot in said end cap adapted to allow the traverse control rod to pass through said slot and said slot has a V-shaped lip; and,
3. an opening in the traverse control rod; and,
4. whereby the V-shaped tip is adapted to fit within the opening in the traverse control rod thereby locking the traverse control rod into the desired position.

14. A drum brush type percussion instrument as in claim 9 wherein:

a. the means for lock comprises:

1. and opening in the handle at the opposite end from which the fingers protrude; and,
2. a spring attached to the outer surface of the handle near the opening and said spring passes through said opening and said spring has a narrow neck and two tabs that protrude outward from said neck at the end of said spring; and,
3. a slot in the traverse control rod and said slot has pairs of notches and said slot is slightly larger than the neck of said spring and said pair of notches along the edge of said slot form an opening slightly larger then the spring with the tab;

4. whereby said spring passes through the opening in the handle and into the slot and said spring's tabs set within one of the pairs of notches thus, locking the traverse control rod and when one wishes to change such position, one puts pressure on a spring at the opening forcing it downward such that the tabs of the spring move below the traverse control rod and allow the traverse control rod to be moved to a new pair of notches and when the pressure is released from said spring, said tabs move upward into the pair of notches thus locking the traverse control rod into the desired position.

15. A drum brush type percussion instrument as in claim 9 wherein:

a. a means for locking comprises:

1. an opening in the handle at the end opposite the end from which the fingers protrude; and,
2. a spring attached to the outer surface of the handle near the opening and said spring runs through said opening; and,
3. a set of serrations in the traverse control rod into which the end of the spring is adapted to fit; and,
4. the spring is of such a shape that when there is no pressure from the outside placed upon the spring the spring engages the serration and locks the traverse control rod into position and when there is pressure placed upon the spring at the opening in the handle, the spring disengages the serration in the traverse control rod and the traverse control rod can be moved to another position where the spring renegades the serrations relocking the traverse control rod.

16. A drum brush type percussion instrument as in claim 9 wherein:

a. a means for locking comprises:

1. a slot in the traverse control rod and said slot has several pairs of notches running along each edge of the slot; and,
2. an opening in the handle above said slot in the traverse control rod; and,
3. a spring that attaches to the outer surfaces of the handle at a point near the opening and said spring passes through said opening and through said traverse control rod; and,
4. a pair of tabs attached to each side of said spring that increases the width of said spring such that said spring is larger then the slot but not as large as the slot and a pair of notches and said tabs are attached to the spring where that said spring passes through said slot; and,
5. whereby when the spring is placed through said traverse control rod and the tabs are in place within said notches the traverse control rod is in a locked position and the traverse control rod is moved by an individual putting pressure on the spring forcing the tab above the traverse control rod and thus allowing the traverse control rod to be moved to another pair of tabs where when the pressure is left off the spring the spring will move downward and move the pair of tabs will fit within a pair of notches thus locking the traverse control rod.

17. A drum brush type percussion instrument as in claim 16 wherein:

a. the spring for the locking device is in the shape of an "s" such that when pressure is placed upon the spring at the opening in the handle, the end of the spring will rise disengaging the serration in the traverse control rod.

* * * * *